US008010410B2

(12) United States Patent
Sundaresan et al.

(10) Patent No.: US 8,010,410 B2
(45) Date of Patent: Aug. 30, 2011

(54) METHOD AND SYSTEM FOR LISTING CATEGORIZATION

(75) Inventors: Neelakantan Sundaresan, Mountain View, CA (US); Vitaliy Zinchenko, San Mateo, CA (US)

(73) Assignee: eBay Inc., San Jose, CA (US)

( * ) Notice: Subject to any disclaimer, the term of this patent is extended or adjusted under 35 U.S.C. 154(b) by 1278 days.

(21) Appl. No.: 11/618,701

(22) Filed: Dec. 29, 2006

(65) Prior Publication Data

US 2008/0162302 A1 Jul. 3, 2008

(51) Int. Cl.
*G06Q 30/00* (2006.01)
(52) U.S. Cl. .......................................... 705/26
(58) Field of Classification Search ............... 705/26, 705/27
See application file for complete search history.

(56) References Cited

U.S. PATENT DOCUMENTS

2011/0015982 A1* 1/2011 Singh et al. ............... 705/14.25

OTHER PUBLICATIONS

4 R Systems Helps Retailers with State-of-the-Art Allocation and Assortment Planning; PR Newswire. New York: Jan. 13, 2003. p. 1.*

* cited by examiner

*Primary Examiner* — Mila Airapetian
(74) *Attorney, Agent, or Firm* — Schwegman, Lundberg & Woessner, P.A.

(57) ABSTRACT

Embodiments of a method and system for listing categorization are disclosed. A category structure may be accessed. The category structure may include a plurality of categories for items. A set of training data may be accessed from a plurality of listings from at least one of supply data and/or demand data. The supply data may be generated from seller activity of a plurality of users in a networked system. The demand data may be generated from buyer activity of the plurality of users in the networked system. Each listing may include a category from the category structure. The set of training data may be provided to a categorization application for training. The categorization application may be capable of building listing statistics by applying a classifier to the set of training data and recommending a category from the category structure for a new listing by utilizing the listing statistics.

21 Claims, 13 Drawing Sheets

METHOD AND SYSTEM FOR LISTING CATEGORIZATION

TECHNICAL FIELD

The present application relates generally to the field of data processing and, in one specific example, to a method and system for listing categorization.

BACKGROUND

Items in a networked system may be listed for sale according to a category. Potential buyers may use categories available within the networked system to locate an item of interest.

BRIEF DESCRIPTION OF THE DRAWINGS

Some embodiments are illustrated by way of example and not limitation in the figures of the accompanying drawings in which.

DETAILED DESCRIPTION

Example methods and systems for listing categorization are described. In the following description, for purposes of explanation, numerous specific details are set forth in order to provide a thorough understanding of example embodiments. It will be evident, however, to one skilled in the art that the present invention may be practiced without these specific details.

In an example embodiment, a category structure may be accessed. The category structure may include a plurality of categories for items. A set of training data may be accessed from a plurality of listings from at least one of supply data or demand data. The supply data may be generated from seller activity of a plurality of users in a networked system. The demand data may be generated from buyer activity of the plurality of users in the networked system. Each listing may include a category from the category structure. The set of training data may be provided to a categorization application for training. The categorization application may be capable of building listing statistics by applying a classifier to the set of training data and recommending a category from the category structure for a new listing by utilizing the listing statistics.

In an example embodiment, a set of training data may be automatically generated for a category structure by applying a classifier to listing data from a plurality of listings from at least one of supply data or demand data. The supply data may be generated from seller activity of a plurality of users in a networked system. The demand data may be generated from buyer activity of the plurality of users in the networked system. Each listing may include a category from the category structure. A categorization application may be trained with the set of newly generated training data.

In an example embodiment, a listing of an item in a networked system may be received. A category suggestion may be determined for the listing of the item from listing statistics. The listing statistics may be built by applying a classifier to a set of training data. Adaptive information regarding the category suggestion may be received. A calculation performed by the classifier may be adjusted from the adaptive information.

Figure 1:
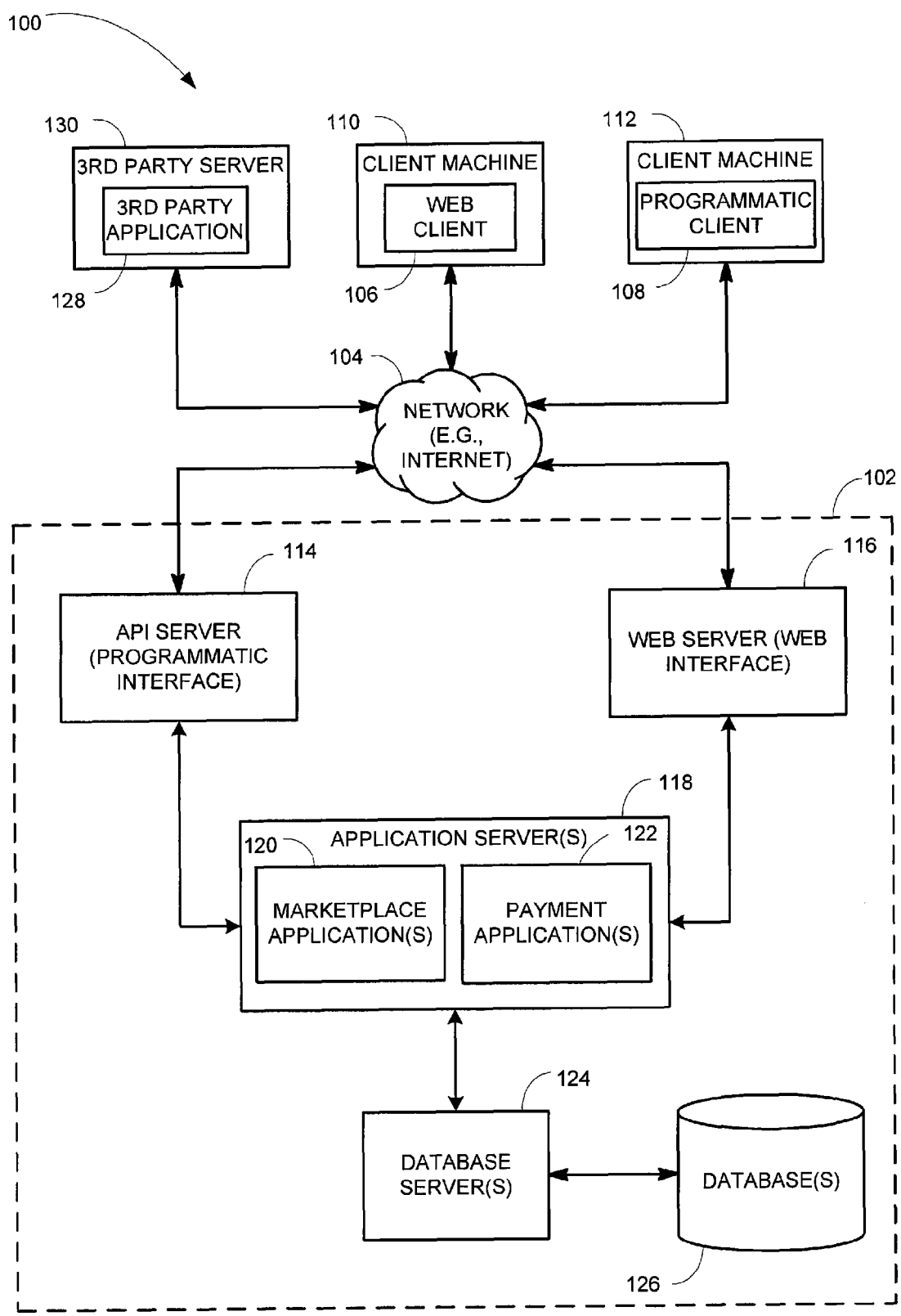
FIG. 1 is a network diagram depicting a network system, according to one embodiment, having a client server architecture configured for exchanging data over a network.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party may, for example, provide one or more promotional, marketplace or payment functions that are supported by the relevant applications of the networked system 102.

Figure 2:
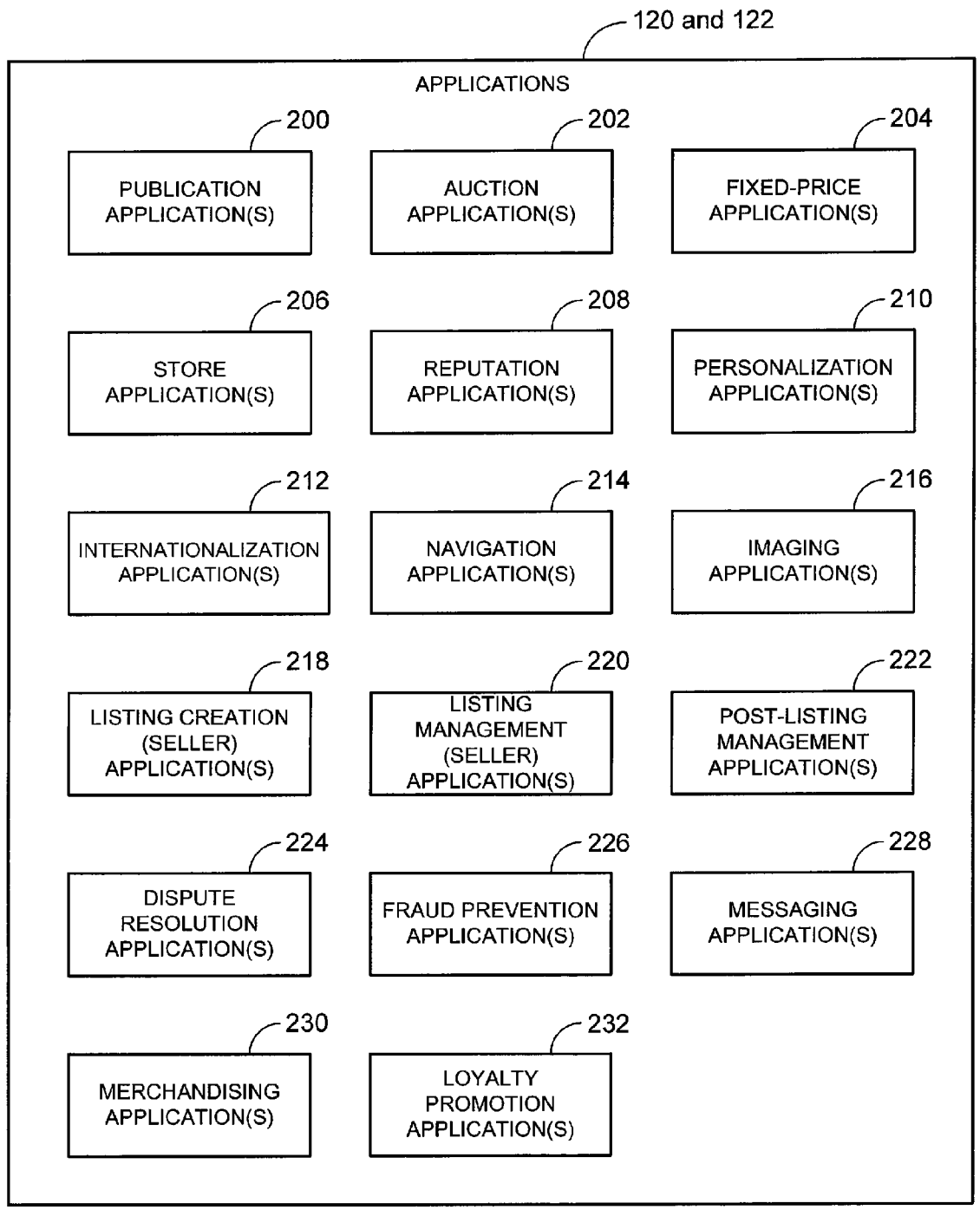
FIG. 2 is a block diagram illustrating an example embodiment of multiple network and marketplace applications, which are provided as part of the network-based marketplace.

FIG. 2 is a block diagram illustrating multiple applications 120 and 122 that, in one example embodiment, are provided as part of the networked system 102 (see FIG. 1). The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized and/or localized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or system inventory structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Figure 3:
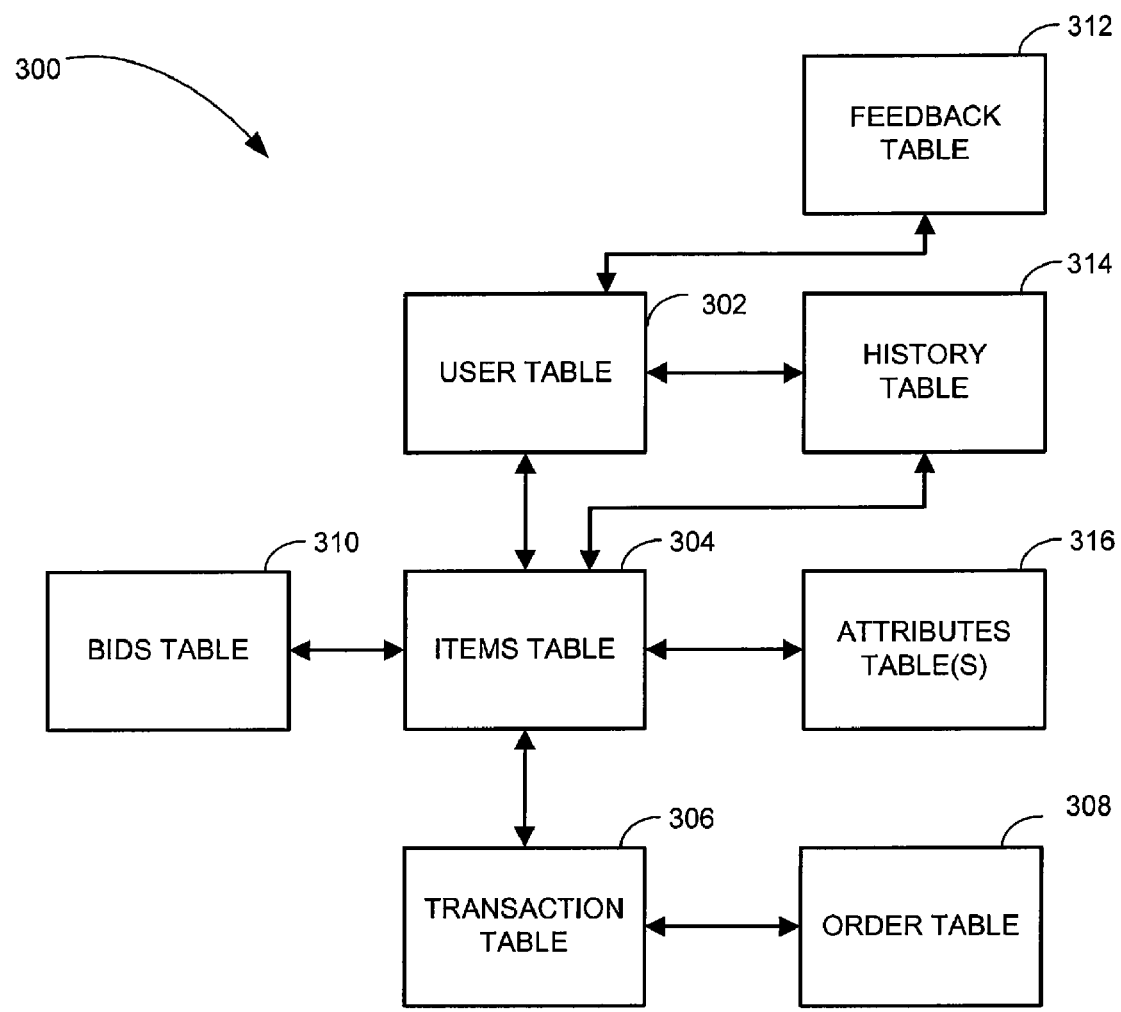
FIG. 3 is a high-level entity-relationship diagram, in accordance with one example embodiment, illustrating various tables that may be maintained within one or more databases.

FIG. 3 is a high-level entity-relationship diagram, illustrating various tables 300 that may be maintained within the databases 126, and that are utilized by and support the applications 120 and 122 (see FIG. 1). A user table 302 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items (e.g., products and/or services) that are offered for sale by the networked system 102.

The tables 300 also include an items table 304 in which are maintained item records for goods and services that are available to be, or have been, transacted via the networked system 102. Each item record within the items table 304 may furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, each order record being associated with an order for a good and/or service. Each order, in turn, may be with respect to one or more transactions for which records exist within the transaction table 306.

Bid records within a bids table 310 each relate to a bid received at the networked system 102 in connection with an auction-format listing supported by an auction application 202. A feedback table 312 is utilized by one or more reputation applications 208, in one example embodiment, to construct and maintain reputation information concerning users.

A history table 314 maintains a history of transactions to which a user has been a party. The transactions may include those pertaining to items for which records exist within the items table 304 and for items with which no records exist within the items table 304 (e.g., for which payment services and functions of the payment application 122 were used without the marketplace application 120).

One or more attribute tables 316 record attribute information pertaining to items for which records exist within the items table 304. Considering only a single example of such an attribute, the attribute tables 316 may indicate a currency attribute associated with a particular item, the currency attribute identifying the currency of a price for the relevant item as specified in by a seller.

Figure 4:
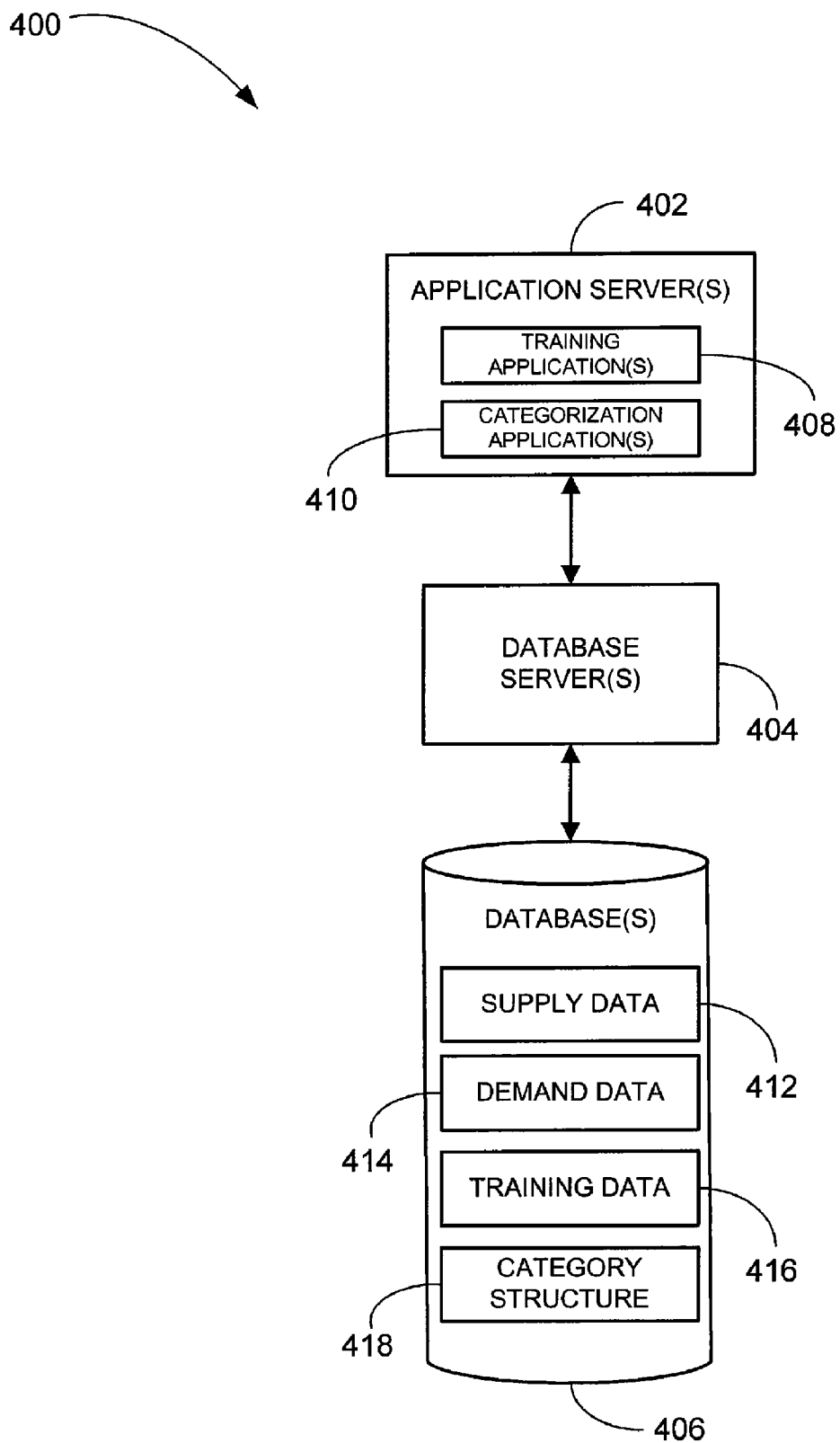
FIG. 4 is a block diagram of an example server system.

Referring to FIG. 4, an example server system 400 is illustrated. In an example embodiment, the server system 400 may be deployed in the networked system 102 (see FIG. 1).

The server system 400 may include an application server 402 communicating with a database server 404. The application server 402 may include the functionality of the application server 118 (see FIG. 1), and the database server 404 may include the functionality of the database server 124 (see FIG. 1). The database server 404 may be in communication with a database 406. The database 406 may include the functionality of the database 126 (see FIG. 1).

The application server 402 may include a training application 408 and/or a categorization application 410. The training application 408 may access listing data for a plurality of listings (e.g., for items in the networked system 102) to create a set of training data 416 to be used by the categorization application 410.

The categorization application 410 may be capable of building listing statistics by applying a classifier to the training data 416 and/or recommending a category from the category structure 418 for a new listing (e.g., of an item) by utilizing the listing statistics. In an example embodiment, the classifier may be a Bayesian classifier (e.g., based on a Bayesian Naïve Classification model), however other problabistic classifiers (e.g., a rank query approach) may also be used.

In an example embodiment, the categorization application 410 may be trained by use of the training data 416 to suggest a category (e.g., a first category or an additional category) from a category structure 418 for a listing. For example, the training application 408 and the categorization application 410 may jointly operate as a classification system.

In one embodiment, the database 406 may include supply data 412, demand data 414, training data 416, and/or the category structure 418.

The supply data 412 may be generated from seller activity of a plurality of users in the networked system 102. For example, the seller activity may include at least one seller from a plurality of users creating a listing for an item within the networked system 102, at least one seller receiving a bid for the item, and/or at least one seller making a sale of the item. It should be appreciated that other seller activity may also be used. In an example embodiment, the training application 408 may access a plurality of listings (e.g., listing data) from the supply data to be used to create the set of training data 416.

The demand data 414 may be generated from buyer activity of the plurality of users in the networked system 102. For example, the buyer activity may include at least one buyer from the plurality of users browsing to a category from the plurality of listings within the networked system 102, at least one buyer searching for a listing of an item for sale (e.g., as the item is currently listed or previously sold from the listing), at least one buyer selecting the listing of the item for sale, at least one buyer bidding on the item for sale, and/or at least one buyer buying the item for sale. It should be appreciated that other buyer activity may also be used. In an example embodiment, the training application 408 may access a plurality of listings (e.g., listing data) from the demand data to be used to create the set of training data 416. It should be appreciated that a selection of a type of buyer activity to be associated with listing data may selected so as to provide a level of confidence that an item was listed in a proper category (e.g., the buyer identifier the item in a proper category).

In an example embodiment, the supply data 412 and/or the demand data 414 may include information accessed from the tables 302-316 (see FIG. 3).

The category structure 418 includes a plurality of categories for items. The categories may be from general to more specific over a number of tiers (e.g., three to seven tiers), and may include a smaller number of categories (e.g., twenty to fifty) at a highest tier and a larger number of categories (e.g., twenty to fifty thousand) at a lower tier. By way of an example, a more general category may include "electronics", a lower category may include televisions or video games, and a more specific category may be "80 GB IPOD" or "Billy Idol". An item may optionally be listed under more than one category within the networked system 102.

Figure 5:
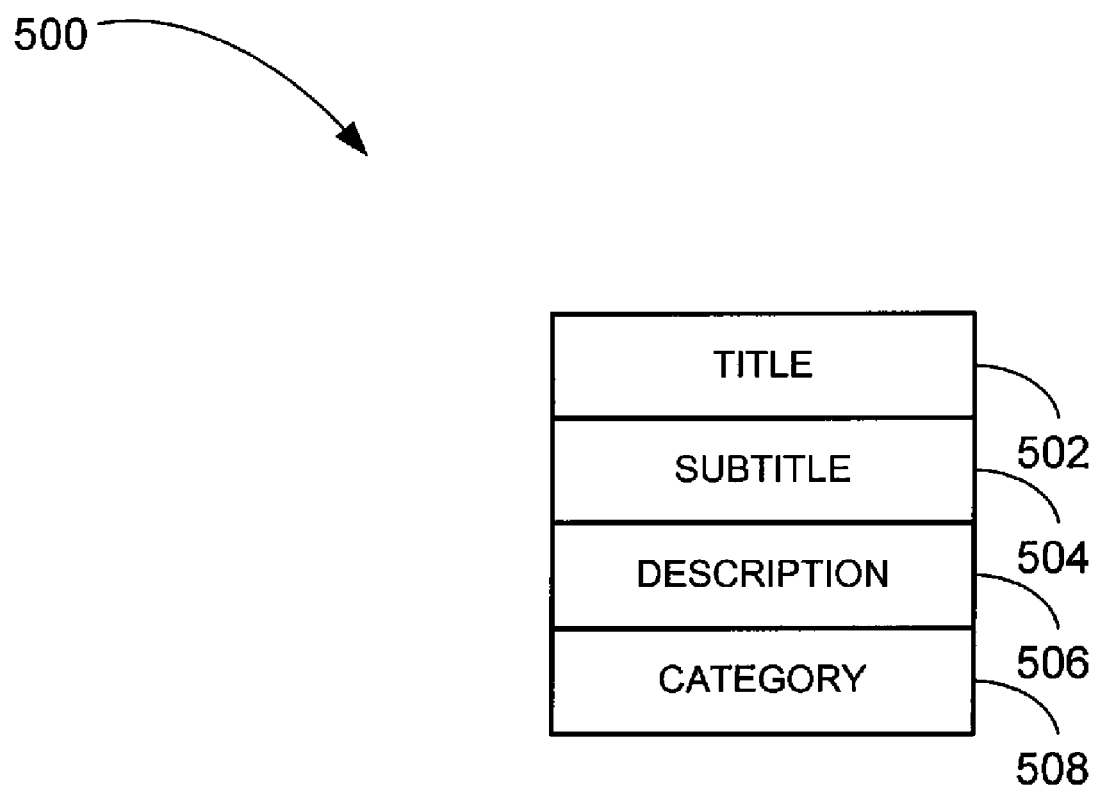
FIG. 5 is a block diagram of an example listing data structure.

Referring to FIG. 5, an example listing data structure 500 for a listing (e.g., of an item) is illustrated. In an example embodiment, the supply data 412, the demand data 414, and/or the training data 416 may include a plurality of listing data structures 500.

The listing data structure 500 may include a title field 502, an optional subtitle field 504, a description field 506, and a category field 508. The title field 502 may provide (e.g., by retaining) a title for the listing. The subtitle field 504 may provide (e.g., by retaining) a subtitle for the listing.

The description field 506 may provide (e.g., by retaining) a description for the listing. For example, the description may include a plurality of sentences describing an item of the listing, shipping information for the item, payment information for the item, a story regarding the item, and the like. The description may optionally be in a markup language format (e.g., HTML).

The category field 508 may provide (e.g., by retaining) a category in which the listing is classified. For example, the category may be selected by a user and/or the categorization application 410 (see FIG. 4).

Figure 6:
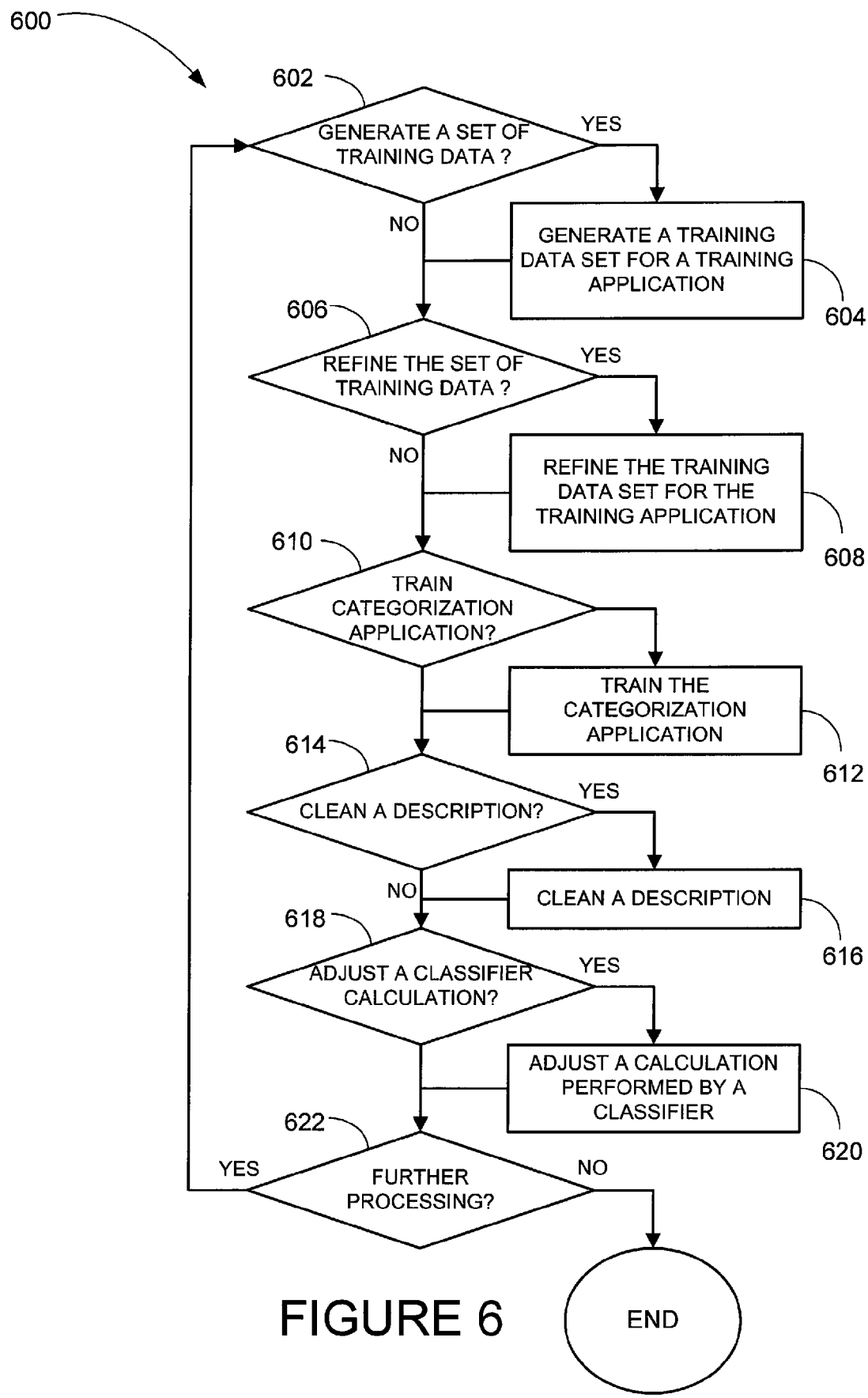
FIG. 6 is a flowchart illustrating a method for processing listings according to an example embodiment.

Referring to FIG. 6, a method 600 for processing listings according to an example embodiment is illustrated. In an example embodiment, the method 600 may be performed by an application on the application servers 402 (see FIG. 4).

A determination may be made at decision block 602 whether to generate a set of training data 416 (see FIG. 4). If a determination is made to generate a set of training data 416, a set of training data 416 (e.g., a training data set 416) may be generated at block 604. An example embodiment of generating a set of training data 416 is described in greater detail below. If a determination is made not to generate a set of training data 416 at decision block 602 or upon completion of the operations at block 604, the method 600 may proceed to decision block 606.

At decision block 606, a determination may be made whether to refine the set of training data 416. If a determination is made to refine the set of training data 416, a set of training data 416 may be refined at block 608. An example embodiment of refining a set of training data 416 is described in greater detail below. If a determination is made not to refine a set of training data 416 at decision block 606 or upon completion of the operations at block 608, the method 600 may proceed to decision block 610.

A determination may be made at decision block 610 whether to train the categorization application 410 (see FIG. 4). If a determination is made to train the categorization application 410, the categorization application 410 may be trained at block 612. An example embodiment of training the categorization application 410 is described in greater detail below. If a determination is made not train the categorization application 410 at decision block 610 or upon completion of the operations at block 612, the method 600 may proceed to decision block 614.

A determination may be made at decision block 614 whether to clean a description of a listing. If a determination is made to clean a description of a listing, the description of the listing may be cleaned at block 616. An example embodiment of cleaning the description of a listing is described in greater detail below. If a determination is made not to clean a description of a listing at decision block 610 or upon completion of the operations at block 612, the method 600 may proceed to decision block 614.

At decision block 618, a determination may be made whether to adjust a calculation performed by a classifier. If a determination is made to adjust a calculation performed by a classifier, the calculation performed by the classifier may be adjusted at block 620. An example embodiment of adjusting the calculation performed by the classifier is described in greater detail below. If a determination is made not to adjust a calculation performed by a classifier at decision block 618 or upon completion of the operations at block 620, the method 600 may proceed to decision block 622.

A determination may be made at decision block 622 whether to perform further processing. If a determination is made to perform further processing, the method 600 may return to decision block 602. If a determination is made not to perform further processing at decision block 622, the method 600 may terminate.

Figure 7:
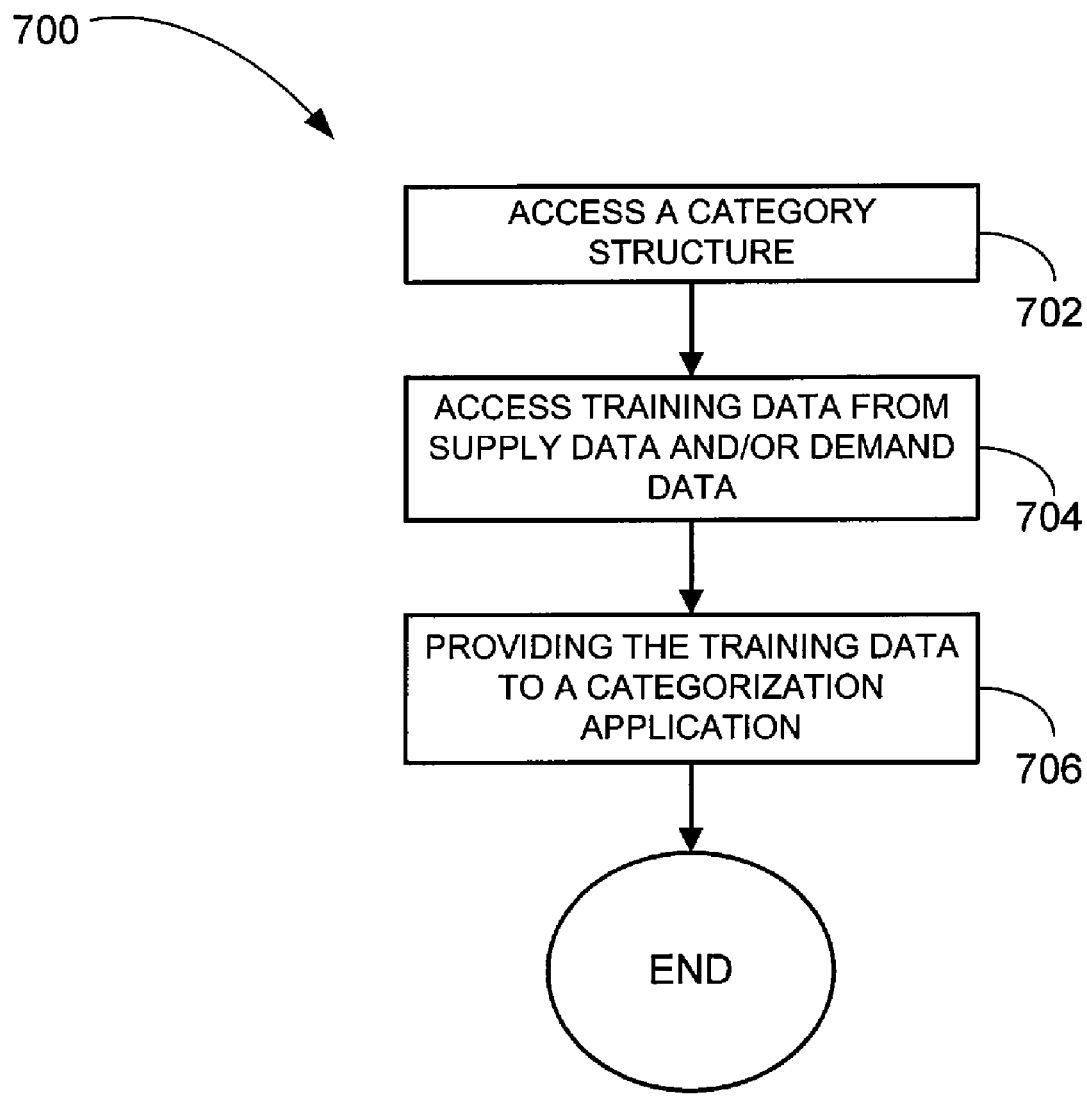
FIG. 7 is a flowchart illustrating a method for generating a set of training data according to an example embodiment.

Referring to FIG. 7, a method 700 for generating a set of training data 416 (see FIG. 4) according to an example embodiment is illustrated. In an example embodiment, the method 700 may be performed at block 604 and/or by the training application 408 (see FIGS. 4 and 6).

A category structure 418 (see FIG. 4) may be accessed at block 702.

A set of training data 416 may be accessed from the supply data 412 and/or the demand data 414 (see FIG. 4) at block 704. For example, the set of training data may be selected from a plurality of listings (e.g., each listing may include a category from the category structure 418) from the supply data and/or the demand data 414.

In an example embodiment, a maximum number of listings (e.g., 1,000; 5,000; or 10,000) may be selected for the set of training data 416 from each category of the category structure 418. It should be appreciated that to obtain the maximum number of listings from the available data a variety of accessing schemes may be used such as accessing the most easily accessible data, accessing the most reliable data, and the like.

The set of training data 416 may be provided to the categorization application 410 for training at block 706. For example, the categorization application 410 may use the set of training data 416 to build listing statistics by applying a classifier to the set of training data 416. The categorization application 410 may utilize the listing statistics to recommend a category from the category structure for a new listing.

Upon completion of the operations at block 706, the method 700 may terminate.

Figure 8:
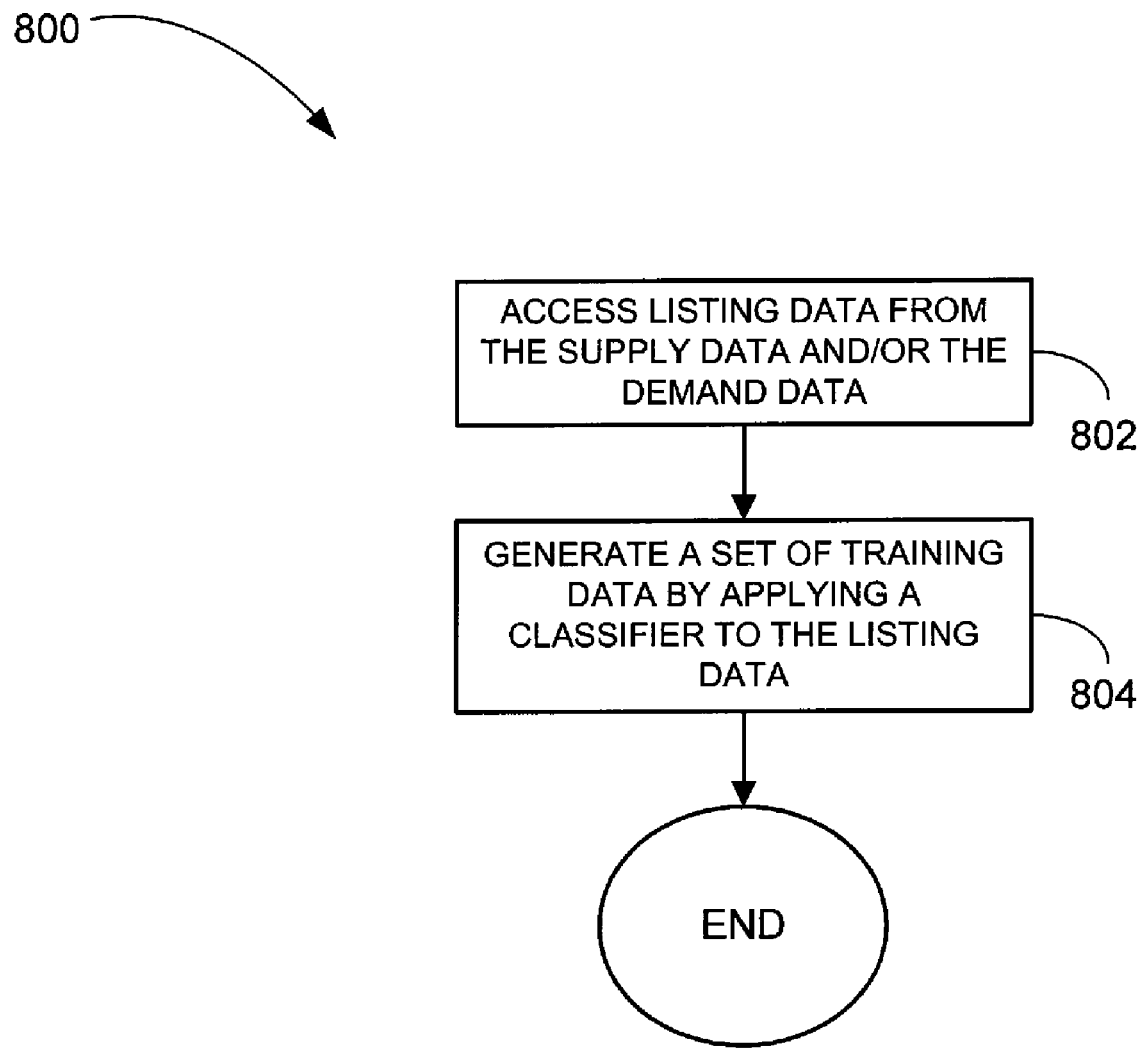
FIG. 8 is a flowchart illustrating a method for refining a training data set for the training application according to an example embodiment.

Referring to FIG. 8, a method 800 for refining a training data set for the training application 408 (see FIG. 4) according to an example embodiment is illustrated. In an example embodiment, the method 800 may be performed at block 608 and/or by the training application 408 (see FIGS. 4 and 6).

Listing data may be accessed from a plurality of listings from the supply data 412 and/or the demand data 414 at block 802.

A set of training data 416 may be automatically generated for the category structure 418 by applying a classifier to the listing data at block 804. For example, a set of training data may be automatically generating by applying a classifier to a title and/or title relevant information within a description of the plurality of listings of the listing data.

Noise words may optionally be removed from the title and/or title relevant information within the description during the operations at block 804 by using a TF/IDF algorithm to eliminate common words and/or by removing stop words.

Upon completion of the operations at block 804, the method 800 may terminate.

Figure 9:
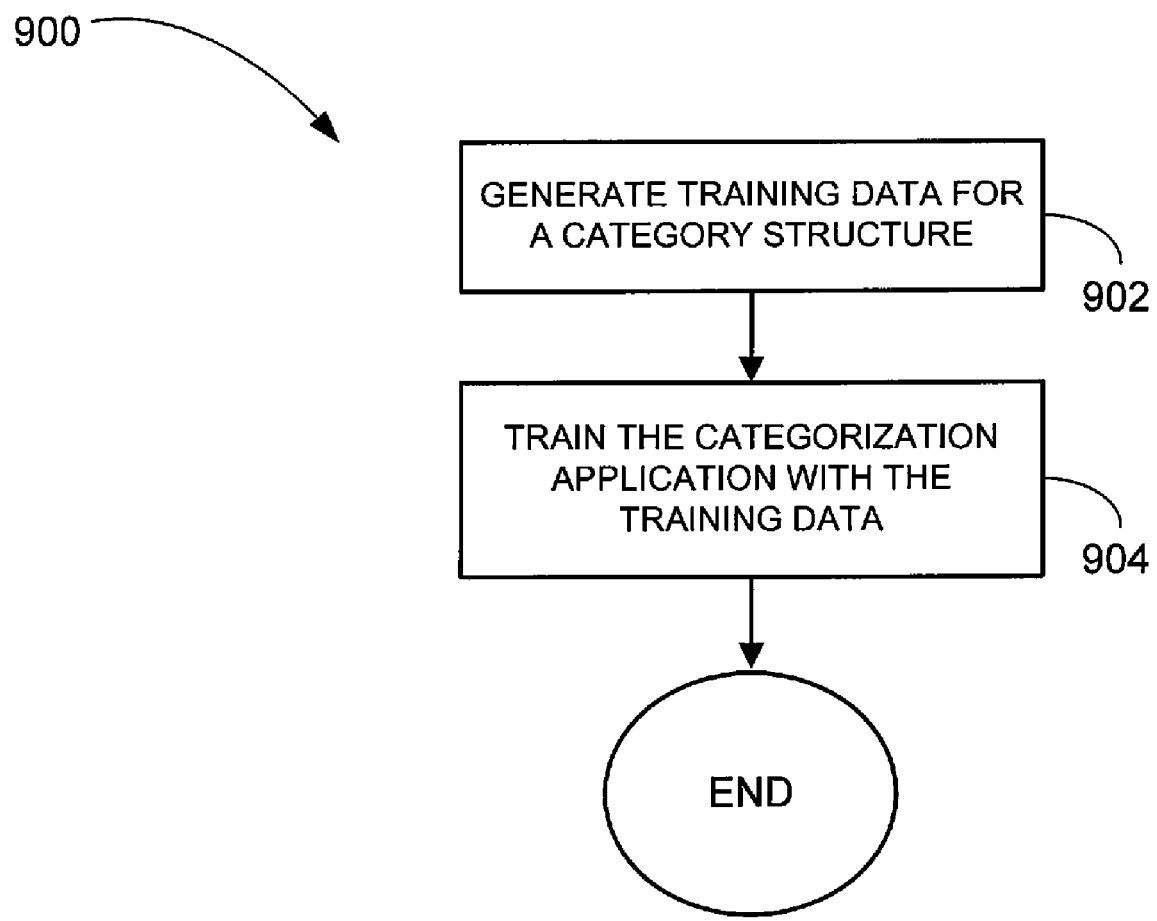
FIG. 9 is a flowchart illustrating a method for training a categorization application according to an example embodiment.

Referring to FIG. 9, a method 900 for training a categorization application 410 (see FIG. 4) according to an example embodiment is illustrated. In an example embodiment, the method 900 may be performed at block 612 (see FIG. 6).

A set of training data may be automatically generated for a category structure 418 by applying a classifier to listing data for a plurality of listings the supply data 412 and/or the demand data 414 at block 902. Each listing of the plurality of listings may include a category from the category structure 418. For example, the operations at block 902 may be performed by the training application 408 (see FIG. 4).

In an example embodiment, automatically generating a set of the training data 416 for the category structure 418 may include accessing a set of existing training data 416, applying a classifier to the existing training data 416 to obtain a categorical recommendation for each of the plurality of listings, and selecting listing data for at least one listing from the plurality of listings where the category of the at least one listing was the same as the categorical recommendation for the at least one listing as a set of newly generated training data 416.

The categorization application 410 may train with the set of newly generated training data 416 at block 904. Upon completion of the operations at block 904, the method 900 may terminate.

In an example embodiment, listing data for a listing may be removed from the set of training data 416 when the listing was not in a category according to the training application 408.

In an example embodiment, a set of newly generated training data 416 (e.g., from performing the operations an additional time) may be reclassified (e.g., by performed the operations at block 902 a second time) and the training application 408 may be retrained with the set of reclassified training data 416 (e.g., by performed the operations at block 904 an additional time).

Figure 10:
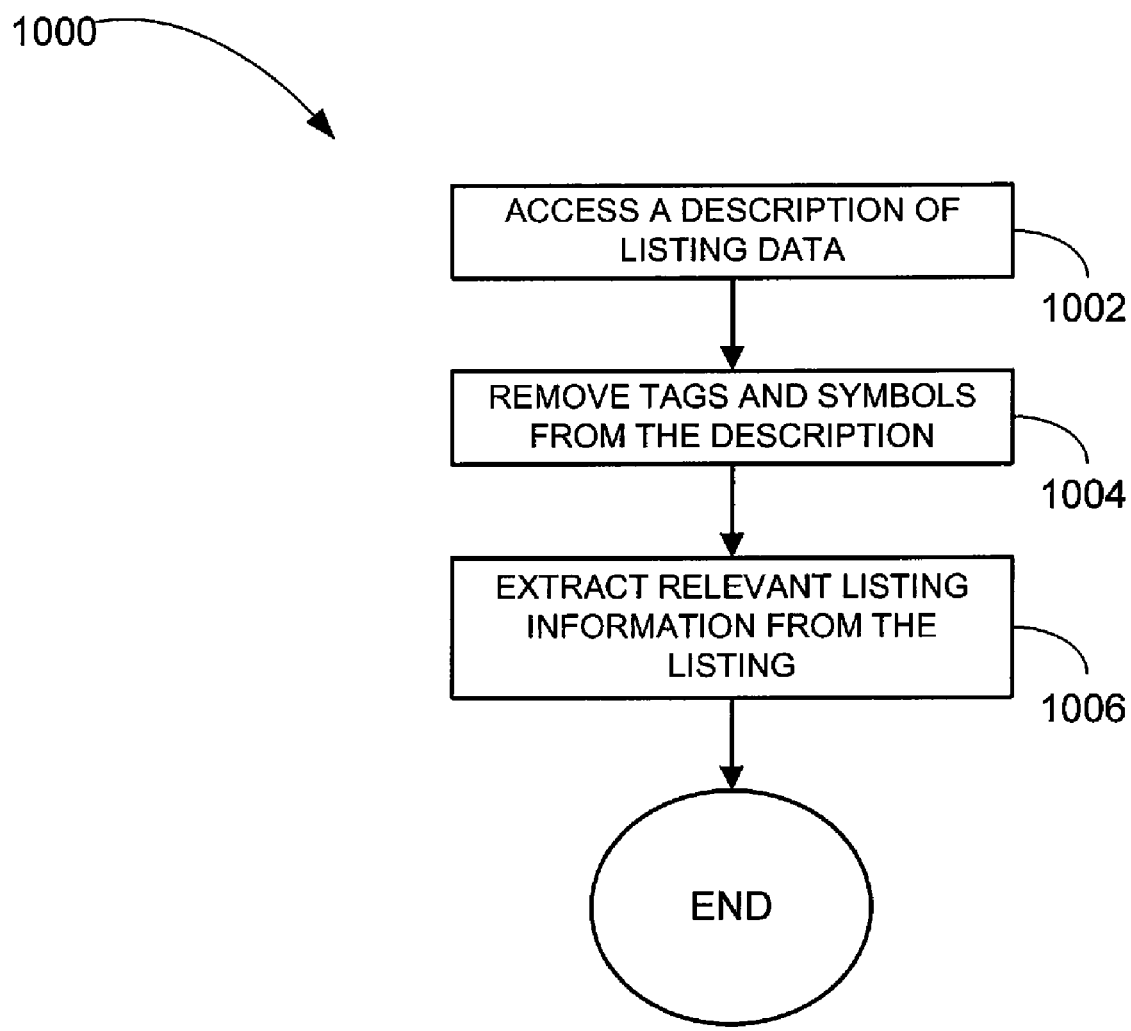
FIG. 10 is a flowchart illustrating a method for cleaning a description of a listing according to an example embodiment.

Referring to FIG. 10, a method 1000 for cleaning a description of a listing according to an example embodiment is illustrated. In an example embodiment, the method 1000 may be performed at block 616 (see FIG. 6).

A description of listing may be accessed at block 1002. For example, the listing may including a title, an optional subtitle, and a description (e.g., associated with the title) including a plurality of sentences.

At least one tag (e.g., an HTML tag) and/or a symbol may optionally be removed from the description and the relevant listing information may be extracted from a remaining portion of the description during the operations at block 1004.

Relevant listing information (e.g., information that is relevant to the listing) may be automatically extracted from the description at block 1006. Upon completion of the operations at block 1006, the method 1000 may terminate.

In an example embodiment, automatically extracting relevant listing information from the description at block 1006 may include extracting at least one sentence from the plurality of sentences that includes at least one word from the title as relevant listing information.

In an example embodiment, automatically extracting listing relevant information from the description at block 1006 may include identifying a first sentence and a last sentence from the plurality of sentences that includes at least one word from the title and extracting the first sentence, the last sentence, and at least one additional sentence between the first sentence and the last sentence in the description as relevant listing information.

It should be appreciated that selection of the operations for automatically extracting listing relevant information from the description at block 1006 may be based on a determination of precision versus coverage.

The method 1000 may be performed to remove noise data from a description of a listing when determining whether the listing is categorized appropriately. For example, performing the method 1000 during generation of a set of the training data 416 at block 902 (see FIG. 9) may filter out potentially misclassified items and improve precision in the set of training data 416.

Figure 11:
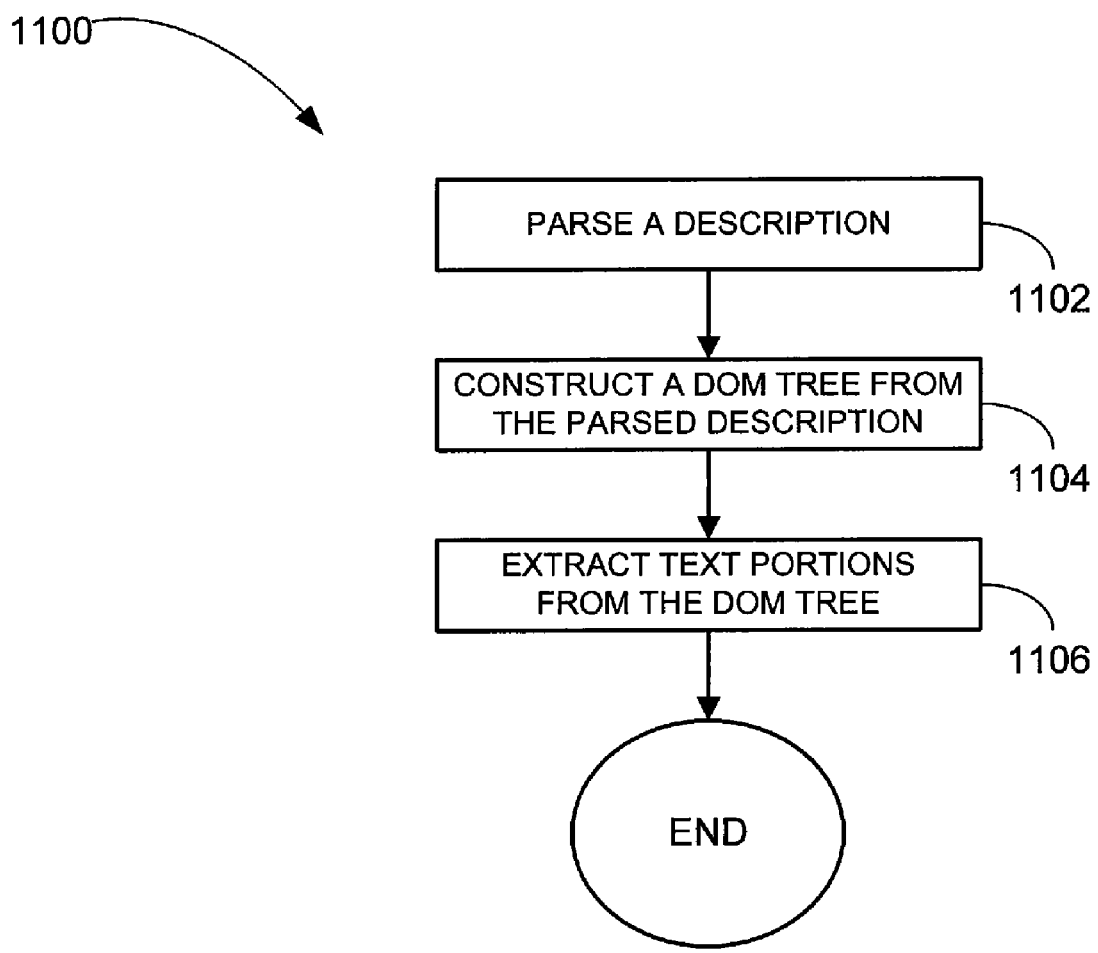
FIG. 11 is a flowchart illustrating a method for removing tags and symbols from a description according to an example embodiment.

Referring to FIG. 11, a method 1100 for removing tags and symbols from a description according to an example embodiment is illustrated. In an example embodiment, the method 1100 may be performed at block 1004 (see FIG. 10).

A description (e.g., of a listing) may be parsed at block 1102. For example, a Tidy library, TagSup, or NekoHTML may be used to parse the description.

A tree (e.g., a dom tree) may be construction from the parsed description at block 1104. However, it should be appreciated that other trees may also be used.

One or more text portions may be extracted from the tree at block 1106. Upon completion of the operations at block 1106, the method 1100 may terminate.

Figure 12:
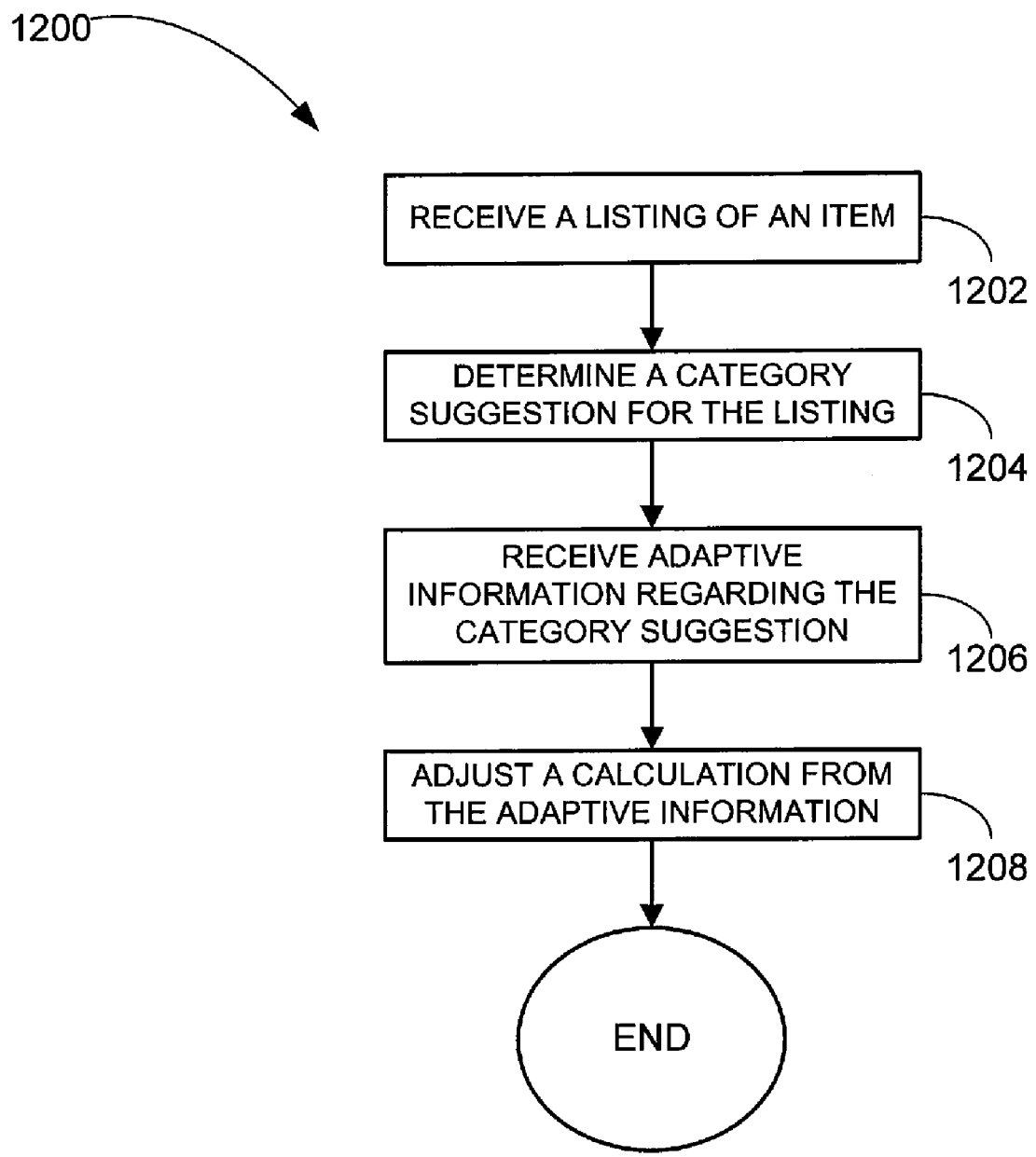
FIG. 12 is a flowchart illustrating a method for adjusting a calculation performed by a classifier according to an example embodiment.

Referring to FIG. 12, a method 1200 for adjusting a calculation performed by a classifier according to an example embodiment is illustrated. In an example embodiment, the method 1200 may be performed at block 620 (see FIG. 6).

A listing of an item in the networked system 102 may be received at block 1202.

A category suggestion may be determined for the listing of the item from listing statistics. For example, the listing statistics may be built (e.g., by the categorization application 410 by applying a classifier to a set of training data 416);

Adaptive information regarding the category suggestion may be received (e.g., from a user) at block 1206.

A calculation performed by the classifier may be adjusted from the adaptive information at block 1208. For example, the adaptive information may include user feedback and a plurality of repeated rejections of the category suggestion.

In an example embodiment, adjusting a calculation by the classifier from the adaptive information at block 1208 may include adjusting a categorization weighing of the calculation performed by the classifier from the adaptive information, the categorization weighing used to determine the category suggestion from listing statistics.

Upon completion of the operations at block 1208, the method 1200 may terminate.

Figure 13:
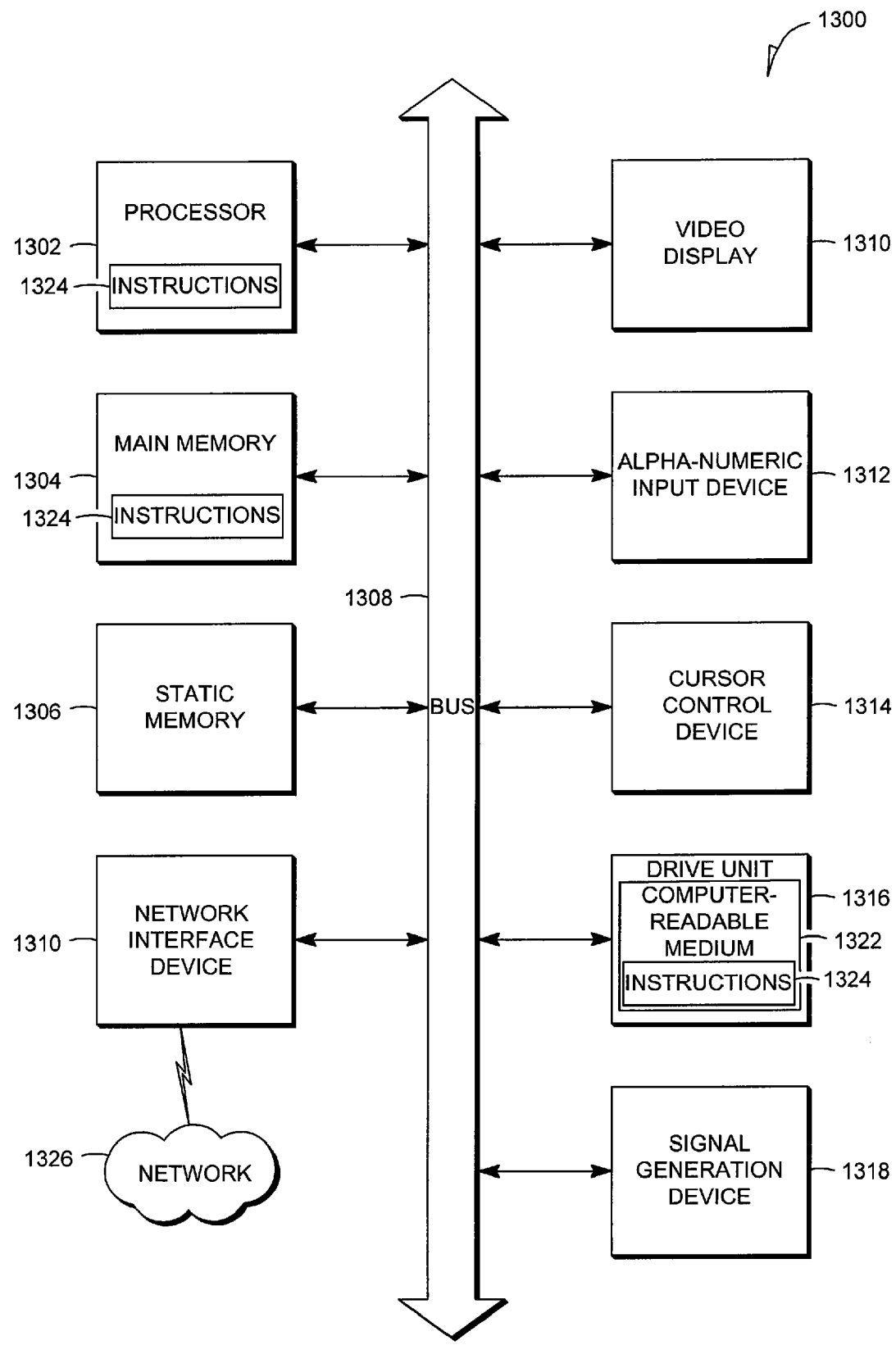
FIG. 13 is a block diagram diagrammatic representation of machine in the example form of a computer system within which a set of instructions, for causing the machine to perform any one or more of the methodologies discussed herein, may be executed.

FIG. 13 shows a diagrammatic representation of machine in the example form of a computer system 1300 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU) a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a cursor control device 1314 (e.g., a mouse), a drive unit 1316, a signal generation device 1318 (e.g., a speaker) and a network interface device 1310.

The drive unit 1316 includes a machine-readable medium 1322 on which is stored one or more sets of instructions (e.g., software 1324) embodying any one or more of the methodologies or functions described herein. The software 1324 may also reside, completely or at least partially, within the main memory 1304 and/or within the processor 1302 during execution thereof by the computer system 1300, the main memory 1304 and the processor 1302 also constituting machine-readable media.

The software 1324 may further be transmitted or received over a network 1326 via the network interface device 1310.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for listing categorization have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    accessing a category structure, the category structure including a plurality of categories for items;
    accessing a set of training data from a plurality of listings from at least one of supply data or demand data, the supply data generated from seller activity of a plurality of users in a networked system, the demand data generated from buyer activity of the plurality of users in the networked system, each listing including a category from the category structure; and
    providing the set of training data to a categorization application for training, the categorization application capable of building listing statistics by applying a classifier to the set of training data and recommending a category from the category structure for a new listing by utilizing the listing statistics.

2. The method of claim 1, wherein the classifier is a Bayesian classifier.

3. The method of claim 1, wherein the buyer activity is at least one of:
    at least one buyer from the plurality of users browsed to a category from the plurality of listings within the networked system, the at least one buyer searched for a listing of an item for sale, the at least one buyer selected the listing of the item for sale, the at least one buyer bid on the item for sale, and the at least one buyer bought the item for sale.

4. The method of claim 1, wherein the seller activity is at least one of:

at least one seller from the plurality of users created a listing for an item within the networked system, the at least one seller received a bid for the item, and the at least one seller made a sale of the item.

5. The method of claim 1, wherein accessing a set of training data from a plurality of listings from at least one of supply data or demand data comprises:

accessing listing data from a plurality of listings from at least one of supply data or demand data, the supply data generated from seller activity of a plurality of users in a networked system, the demand data generated from buyer activity of the plurality of users in the networked system, each listing including a category from the category structure; and automatically generating a set of training data for the category structure by applying a classifier to the listing data.

6. The method of claim 5, wherein automatically generating a set of training data comprises:

automatically generating a set of training data by applying a classifier to a title of the plurality of listings of the listing data.

7. The method of claim 5, wherein automatically generating a set of training data comprises:

automatically generating a set of training data by applying a classifier to at least one of a title and title relevant information within a description of the plurality of listings.

8. A machine-readable non-transitory storage medium comprising instructions, which when executed by a machine, cause the machine to: access a category structure, the category structure including a plurality of categories for items; access a set of training data from a plurality of listings from at least one of supply data or demand data, the supply data generated from seller activity of a plurality of users in a networked system, the demand data generated from buyer activity of the plurality of users in the networked system, each listing including a category from the category structure; and provide the set of training data to a categorization application for training, the categorization application capable of building listing statistics by applying a classifier to the set of training data and recommending a category from the category structure for a new listing by utilizing the listing statistics.

9. The machine-readable medium non-transitory storage of claim 8, wherein causing the machine to access a set of training data from a plurality of listings from at least one of supply data or demand data causes the machine to: access listing data from a plurality of listings from at least one of supply data or demand data, the supply data generated from seller activity of a plurality of users in a networked system, the demand data generated from buyer activity of the plurality of users in the networked system, each listing including a category from the category structure; and automatically generate a set of training data for the category structure by applying a classifier to the listing data.

10. The machine-readable non-transitory storage medium of claim 8, wherein the classifier is a Bayesian classifier.

11. The machine-readable non-transitory storage medium of claim 8, wherein the buyer activity is at least one of:

at least one buyer from the plurality of users browsed to a category from the plurality of listings within the networked system, the at least one buyer searched for a listing of an item for sale, the at least one buyer selected the listing of the item for sale, the at least one buyer bid on the item for sale, and the at least one buyer bought the item for sale.

12. The machine-readable non-transitory storage medium of claim 8, wherein the seller activity is at least one of:

at least one seller from the plurality of users created a listing for an item within the networked system, the at least one seller received a bid for the item, and the at least one seller made a sale of the item.

13. The machine-readable non-transitory storage medium of claim 9, wherein automatically generating a set of training data comprises: automatically generating a set of training data by applying a classifier to a title of the plurality of listings of the listing data.

14. The machine-readable non-transitory storage medium of claim 9, wherein automatically generating a set of training data comprises: automatically generating a set of training data by applying a classifier to at least one of a title and title relevant information within a description of the plurality of listings.

15. A system comprising:

a memory;

at least one processor coupled to the memory;

a first module to access, using the at least one processor, a category structure, the category structure including a plurality of categories for items;

a second module to access, using the at least one processor, a set of training data from a plurality of listings from at least one of supply data or demand data, the supply data generated from seller activity of a plurality of users in a networked system, the demand data generated from buyer activity of the plurality of users in the networked system, each listing including a category from the category structure; and a third module to provide the set of training data to a categorization application for training, the categorization application capable of building listing statistics by applying a classifier to the set of training data and recommending a category from the category structure for a new listing by utilizing the listing statistics.

16. The system of claim 15, wherein the classifier is a Bayesian classifier.

17. The system of claim 15, wherein the buyer activity is at least one of:

at least one buyer from the plurality of users browsed to a category from the plurality of listings within the networked system, the at least one buyer searched for a listing of an item for sale, the at least one buyer selected the listing of the item for sale, the at least one buyer bid on the item for sale, and the at least one buyer bought the item for sale.

18. The system of claim 15, wherein the seller activity is at least one of:

at least one seller from the plurality of users created a listing for an item within the networked system, the at least one seller received a bid for the item, and the at least one seller made a sale of the item.

19. The system of claim 15, wherein the second module is to:

access listing data from the plurality of listings from the at least one of supply data or demand data, the supply data generated from seller activity of a plurality of users in a networked system, the demand data generated from buyer activity of the plurality of users in the networked system, each listing including a category from the category structure; and automatically generate the set of training data for the category structure by applying a classifier to the listing data.

20. The system of claim 19, wherein the second module is to automatically generate the set of training data by applying a classifier to a title of the plurality of listings of the listing data.

21. The system of claim 19, wherein the second module is to automatically generate the set of training data by applying a classifier to at least one of a title and title relevant information within a description of the plurality of listings.

* * * * *

UNITED STATES PATENT AND TRADEMARK OFFICE
CERTIFICATE OF CORRECTION

PATENT NO. : 8,010,410 B2  
APPLICATION NO. : 11/618701  
DATED : August 30, 2011  
INVENTOR(S) : Neelakantan Sundaresan et al.

Page 1 of 1

It is certified that error appears in the above-identified patent and that said Letters Patent is hereby corrected as shown below:

In column 7, line 2, delete "probablistic" and insert -- probabilistic --, therefor.

In column 11, line 13, delete "416);" and insert -- 416). --, therefor.

In column 13, line 52, in Claim 9, delete "medium non-transitory storage" and insert -- non-transitory storage medium --, therefor.

Signed and Sealed this

Twenty-fifth Day of October, 2011

David J. Kappos  
*Director of the United States Patent and Trademark Office*